United States Patent
Zima et al.

(10) Patent No.: US 7,814,757 B2
(45) Date of Patent: Oct. 19, 2010

(54) OPERATING ALGORITHM FOR REFRIGERANT SAFETY SYSTEM

(75) Inventors: Mark James Zima, Clarence Center, NY (US); Taylor R. Eckstein, Jr., N. Tonawanda, NY (US)

(73) Assignee: Delphi Technologies, Inc., Troy, MI (US)

( * ) Notice: Subject to any disclaimer, the term of this patent is extended or adjusted under 35 U.S.C. 154(b) by 1072 days.

(21) Appl. No.: 11/519,264

(22) Filed: Sep. 12, 2006

(65) Prior Publication Data

US 2008/0060367 A1    Mar. 13, 2008

(51) Int. Cl.
*F25B 45/00* (2006.01)
(52) U.S. Cl. .................................... 62/149
(58) Field of Classification Search ........... 62/125, 62/126, 127, 129, 149, 244, 157, 231
See application file for complete search history.

(56) References Cited

U.S. PATENT DOCUMENTS

| | | |
|---|---|---|
| 5,775,406 A | 7/1998 | Ghitea et al. |
| 6,085,531 A | 7/2000 | Numoto et al. ............... 62/149 |
| 6,912,860 B2 | 7/2005 | Zima et al. ............... 62/149 |
| 7,224,285 B2 * | 5/2007 | Tiwet et al. ............... 340/632 |
| 2004/0250983 A1 | 12/2004 | Arndt et al. |
| 2005/0028540 A1 | 2/2005 | Zima et al. |
| 2005/0040942 A1 | 2/2005 | Johnston et al. |

FOREIGN PATENT DOCUMENTS

| | | |
|---|---|---|
| DE | 4014499 | 11/1991 |
| DE | 103 16 352 | 11/2004 |
| DE | 103 18 504 | 11/2004 |
| JP | 2004192531 A * | 7/2004 |

OTHER PUBLICATIONS

Partial European Search Report dated Dec. 21, 2007.

* cited by examiner

*Primary Examiner*—Marc E Norman
(74) *Attorney, Agent, or Firm*—Patrick M. Griffin

(57) ABSTRACT

A method of operating a directed relief valve to ventilate a refrigerant by sensing the concentration of refrigerant leakage from the air conditioning system, and if the first concentration exceeds a threshold, by sensing a second concentration. If the first and second concentrations exceed a predetermined concentration, the system will send a leak message to the operator and/or ventilate the refrigerant to the surrounding atmosphere. The system continuously monitors the refrigerant leakage concentration when the vehicle engine is operative, but only periodically monitors the refrigerant leakage concentration when the vehicle engine is inoperative.

2 Claims, 3 Drawing Sheets

OPERATING ALGORITHM FOR REFRIGERANT SAFETY SYSTEM

BACKGROUND OF THE INVENTION

1. Field of the Invention

The subject invention relates to an air conditioning system, and more specifically, to a method of operating a directed relief valve to ventilate a refrigerant from the air conditioning system.

2. Description of the Prior Art

Air conditioning systems with directed relief valves for ventilating refrigerant are well known in the art. An example of such a system is disclosed in the U.S. Pat. No. 6,085,531 (the '531 patent) to Numoto et al.

The '531 patent discloses an air conditioning system utilizing a flammable refrigerant, such as propane. The system includes the standard components of a compressor, a condenser, an expansion device, and an evaporator. The system also includes a sensor to continuously monitor leakage of the refrigerant, particularly in an air space. When a leak is detected, the sensor generates a signal. A directed relief valve receives the signal and opens the valve in response to the signal to ventilate the refrigerant to the surrounding atmosphere.

The U.S. Pat. No. 6,912,860 (the '860 patent) to Zima et al. discloses another air conditioning system utilizing a potentially toxic or flammable refrigerant and includes the same standard components and a sensor to continuously monitor leakage of the refrigerant. The '860 patent additionally discloses a method for checking proper sensor operation. When a single sensor is utilized and a malfunction is determined, a controller generates a malfunction signal to be sent to the operator, and the system ventilates the refrigerant to the surrounding atmosphere. In the event that less than all of the plurality of sensors show a malfunction when a plurality of sensors are utilized, a controller generates a malfunction signal to be sent to the operator without ventilating the refrigerant. However, in the event that all of the plurality of sensors indicate a malfunction, the controller generates a malfunction signal and actually ventilates the refrigerant to the surrounding atmosphere.

Although the prior art air conditioning systems continuously monitor refrigerant leakage and proper sensor operation to allow for ventilation of a refrigerant to the atmosphere in case of a refrigerant leak or sensor malfunction, there remains the need for an air conditioning system that is more fail-safe and/or operative over a wide range of vehicle operating conditions.

SUMMARY OF THE INVENTION AND ADVANTAGES

The invention provides a method of ventilating an air conditioning system having a controller and a sensor for sensing the presence of the refrigerant outside of the air conditioning system in a vehicle. The method comprises the steps of sensing a first concentration of the refrigerant outside of the air conditioning system with the sensor and periodically performing the sensing step with the controller at the expiration of every predetermined period of time without performing the sensing step during the predetermined period.

European legislation will require the phase-out of R-134a in mobile air conditioning systems beginning in 2011. There are several alternatives under consideration, however, some of these alternatives have potential safety risks. To help mitigate the potential risk from a possible leak into the passenger compartment, the method will monitor for unacceptable concentration of refrigerant from any potential leaks into the passenger compartment and if detected, discharge the refrigerant from the refrigerant loop via directed relief valves. The method will protect the vehicle occupants with the vehicle power whether the engine is operative or inoperative by periodically sensing for an unacceptable refrigerant concentration. With today's sensor and battery technology, sensing for an unacceptable refrigerant concentration can be cycled when the engine is inoperative to avoid draining either the vehicle battery or the directed relief system back-up battery.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 3:
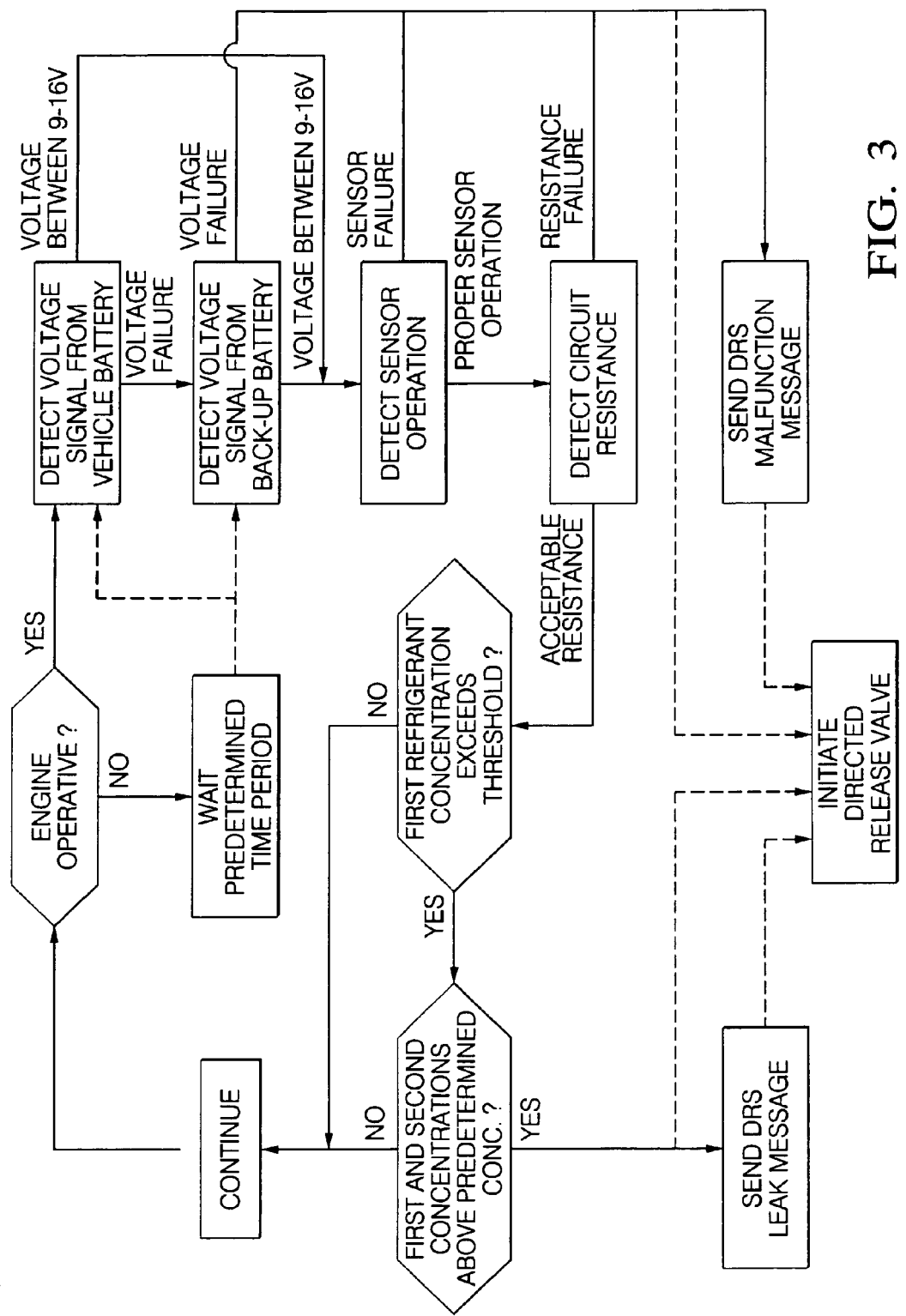
FIG. 3 is a flowchart showing an algorithm for operating a directed relief system for use with the air conditioning system.

Referring to the Figures, wherein like numerals indicate corresponding parts throughout the several views, a method of ventilating an air conditioning system 20 is shown in FIG. 3. An example of such an air conditioning system is shown at 20 in FIG. 1. Those skilled in the art appreciate that the method may be used to ventilate alternative air conditioning systems 20. Preferably, the air conditioning system 20 is located in a vehicle having an engine and a vehicle battery. However, those skilled in the art realize alternatives in which the air conditioning system 20 is implemented into a building, an industrial cooling system, a refrigerator, etc.

The air conditioning system 20 utilizes a refrigerant. The refrigerant is of type R-152a or carbon dioxide ($CO_2$). Those skilled in the art appreciate that other refrigerants could also be employed. These refrigerants include, but are not limited to R-12/CFC-12, R-134a/HFC-134a, isobutane, and propane.

Figure 1:
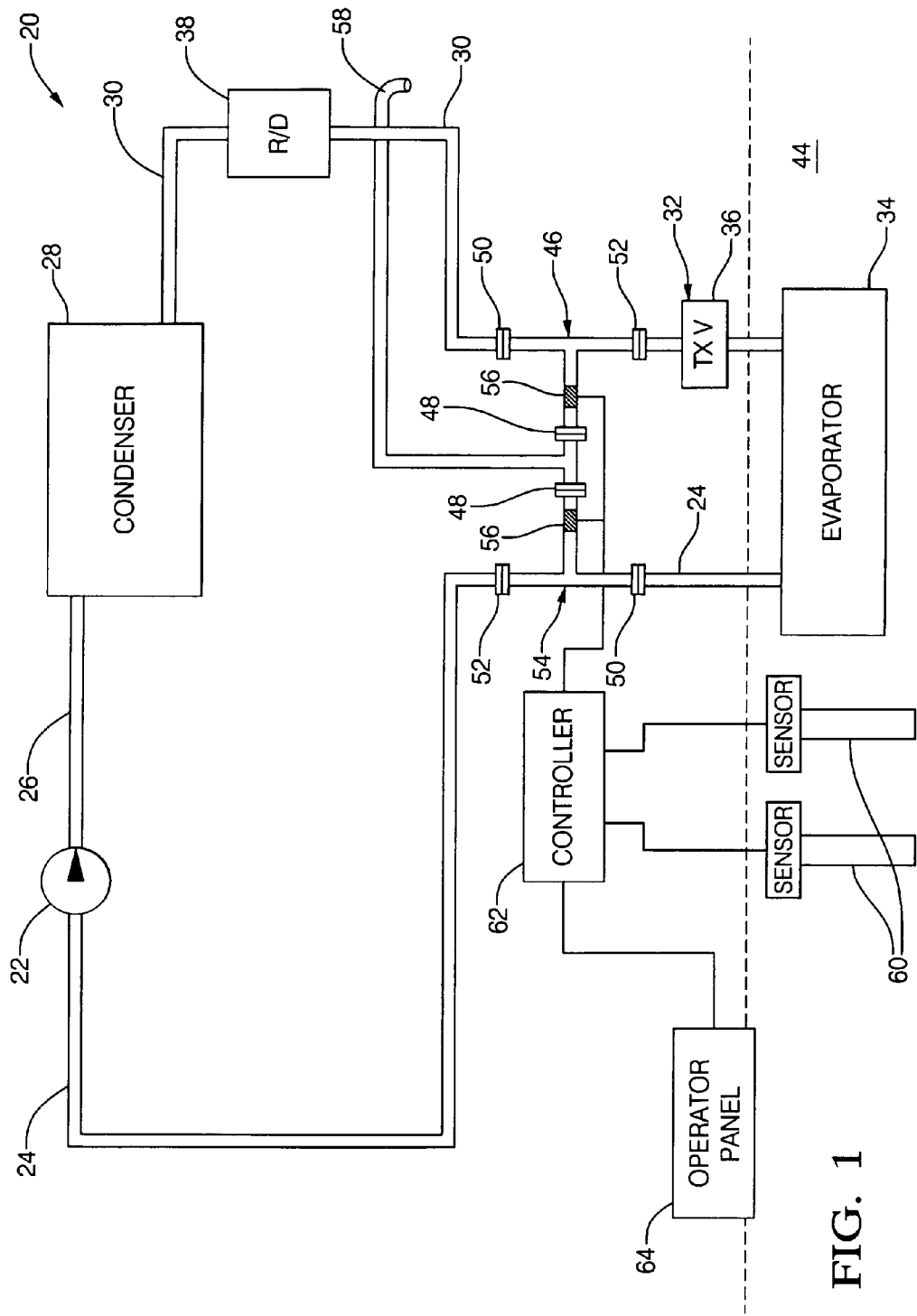
FIG. 1 is a schematic view of a first embodiment of an air conditioning system showing a thermostatic expansion valve implemented as an expansion device.
Figure 2:
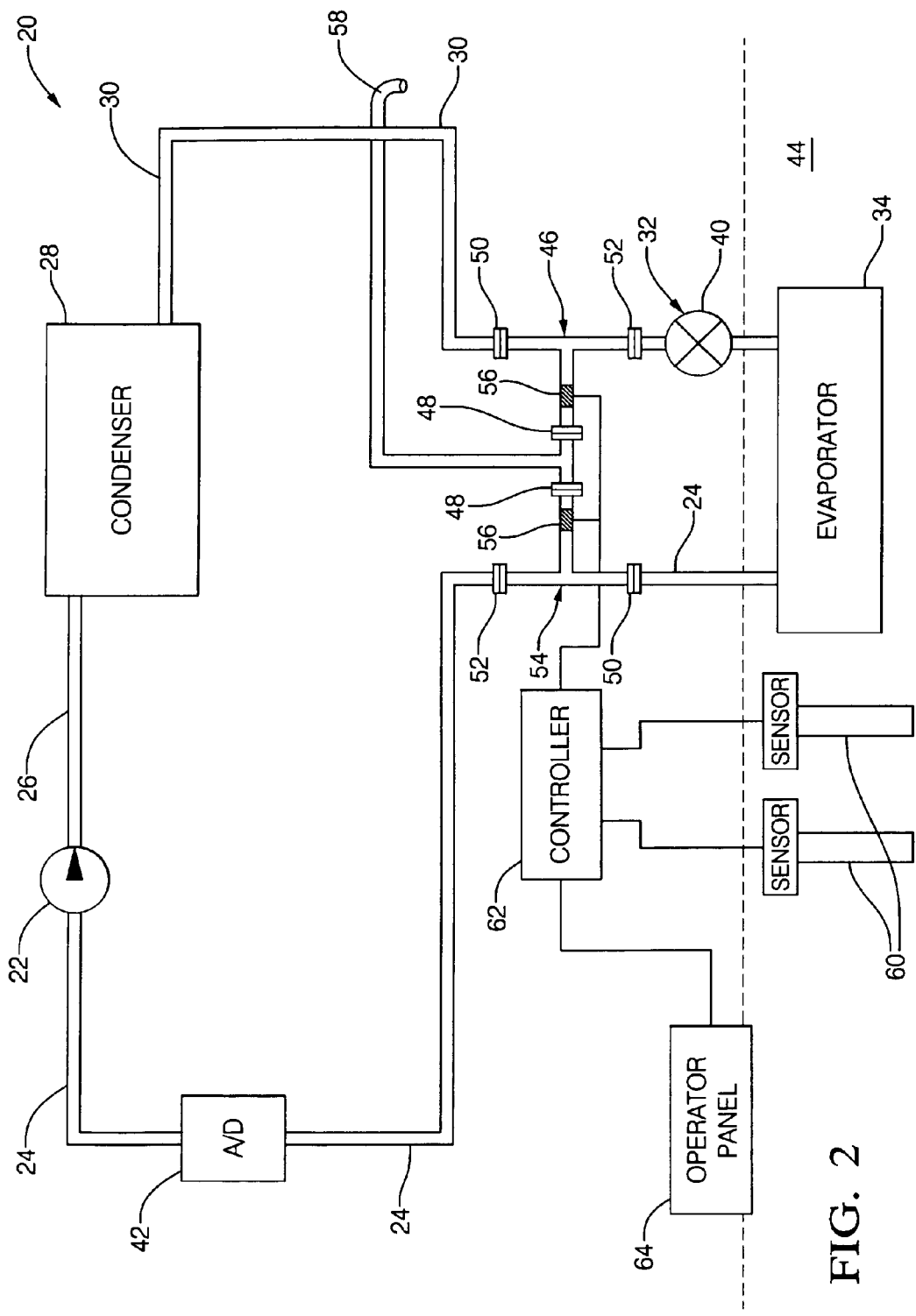
FIG. 2 is a schematic view of a second embodiment of the air conditioning system showing an orifice tube implemented as the expansion device.

A compressor 22 is operatively connected to a suction line 24. The suction line 24 contains the refrigerant in a low pressure, gaseous state. The compressor 22 receives the refrigerant from the suction line 24 and compresses the refrigerant into a high-pressure gaseous state. A gas line 26 is operatively connected to the compressor 22 for receiving the refrigerant and transporting it along in the system. A condenser 28 or gas cooler is operatively connected to the gas line 26. The condenser 28 cools the refrigerant received from the gas line 26. The condenser 28 dissipates heat removed from the refrigerant to the environment. A liquid line 30 is operatively connected to the condenser 28 for receiving the refrigerant from the condenser 28. An expansion device 32 is operatively connected to the liquid line 30. An evaporator 34 is also operatively connected to the expansion device 32. The expansion device 32 restricts the flow of the refrigerant using the Joules-Thompson effect to significantly cool and lower the pressure of the refrigerant before entering the evaporator 34. In a first embodiment of FIG. 1, a thermostatic expansion valve (TXV) 36 performs the function of the expansion device 32. The TXV 36 dynamically regulates the flow of refrigerant into the evaporator 34. In this first embodiment, a receiver/dryer 38 is typically connected in-line with the liquid line 30. In a second embodiment, as shown in FIG. 2, an orifice tube 40 is used as a static, fixed implementation of the expansion device 32. An accumulator/dehydrator 42 is implemented in-line with the suction line 24 in the second embodiment. The evaporator 34 is preferably located within an air space 44 and includes a series of coils. As air flows through the air space 44 and the evaporator 34, it is cooled by heat exchange with the coils of the evaporator 34. The evaporator 34 is also operatively connected to the suction line 24 for sending the now low-pressure, mostly gaseous refrigerant back to the compressor 22.

A first directed relief valve 46 is integrated with the air conditioning system 20 in order to ventilate the refrigerant to the atmosphere. The first directed relief valve 46 includes an ambient port 48 open to the atmosphere. The first directed relief valve 46 also includes an inlet 50 for receiving the refrigerant and an outlet 52 for sending the refrigerant. The inlet 50 and outlet 52 are operatively connected inline to one of the lines 24, 26, 30, such as the suction line 24, the gas line 26, or the liquid line 30. Additional directed relief valves, such as a second directed relief valve 54, may also be implemented in the system. The embodiments shown in FIGS. 1 and 2 illustrate the first directed relief valve 46 in-line with the liquid line 30 and the second directed relief valve 54 in-line with the suction line 24. Those skilled in the art realize that alternate locations and quantities of the directed relief valves 46 are possible. However, for ease of illustration, only the first directed relief valve 46 will be described hereforth.

A squib 56 is positioned within the first directed relief valve 46 to block the inlet 50 and the outlet 52 from the ambient port 48. During normal operation, when no refrigerant is detected outside the system, refrigerant enters the inlet 50 and flows out the outlet 52; no refrigerant flows to the ambient port 48. However, in response to the refrigerant being detected outside the air conditioning system 20 in the air space 44, the squib 56 detonates and deflagrates, thus unblocking the inlet 50 and the outlet 52 from the ambient port 48. Refrigerant then flows in through the inlet 50 and the outlet 52 to the ambient port 48. The ambient port 48 is preferably connected to a port tube 58. The port tube 58 leads to a location away from the air space 44 for ventilating the refrigerant to the atmosphere. Experimentation with the air conditioning system 20 has shown that ventilating the refrigerant from the system takes about six to ten seconds. Ventilation of the refrigerant may be required for a number of reasons, including, but not limited to, potential toxicity or flammability related to the refrigerant.

The air conditioning system 20 uses a sensor 60 for detecting refrigerant should a leak occur. The sensor 60 is preferably located in the air space 44, close to the evaporator 34. The sensor 60 senses the refrigerant and produces a sensor 60 signal in response to sensing the refrigerant. Depending on the reliability and sensing needs of the sensor 60, additional sensors 60 may be required. Various types of acceptable sensors 60 are well known to those skilled in the art. These types include, but are not limited to, sensors 60 utilizing infrared light, LED's, or a heating element.

A controller 62 is electrically connected to the sensor 60 and the squib 56. The controller 62 contains all the necessary electrical and electronic components to perform its function as described herein. These components include, but are not limited to, a power supply, a microprocessor, an analog-to-digital converter, an amplifier, and a relay. The controller 62 receives a sensor 60 signal from the sensor 60. The controller 62 analyzes the sensor 60 signal by comparing a current value of the signal to a lookup table, equations, or other set of predetermined values stored within the controller 62. From analyzing the sensor 60 signal, the controller 62 determines whether no refrigerant leak is detected, a refrigerant leak is detected, or the sensor 60 has malfunctioned. In response to the sensor 60 signal indicating that a refrigerant leak is detected, the controller 62 sends a ventilation signal to the squib 56. The squib 56 then initiates an opening by deflagrating, causing the refrigerant to be discharged from the system to the atmosphere.

An operator panel 64 is also electrically connected to the controller 62. The operator panel 64 can be an instrument panel, an electronic display, a speaker, or other similar mechanism to convey messages to an operator of the vehicle. The controller 62 sends a directed relief system (DRS) ventilation message to the operator panel 64 in response to the squib 56 being deflagrated. The DRS ventilation message notifies the operator that the air conditioning system 20 is malfunctioning and must be serviced.

The method of ventilating the air conditioning system 20 is shown in FIG. 3 and consists of the step of detecting a first voltage signal in a first operating range from the vehicle battery and the step of detecting a second voltage signal in a second operating range from a back-up battery. The vehicle battery is the primary choice to power the DRS, and the DRS back-up battery provides reserve power. The method also includes the step of setting the first and second operating ranges between 9 and 16 Volts.

The method includes the step of detecting the operation of the sensor 60. The air conditioning system 20 may alternatively include a plurality of sensors 60 in which case the method would alternatively include the step of detecting the operation of a plurality of sensors 60. A method, such as the one disclosed in U.S. Pat. No. 6,912,860 (the '860 patent) to Zima et al., can be used to ventilate the air conditioning system 20 when the DRS is unable to detect operation of the sensor 60. The air conditioning system disclosed in the '860 patent determines a sensor malfunction by a controller's analysis of a sensor signal. When a single sensor is utilized, the controller sends a ventilation signal to a squib upon detection of a malfunction to activate a directed pressure relief valve. When a plurality of sensors are utilized, the controller sends the ventilation signal to the squib only in response to all of the plurality of sensors indicating a malfunction. In the event that less than all of the plurality of sensors indicate a malfunction, the ventilation signal will not be sent. However, a partial malfunction signal will be sent to an operator panel to notify the operator to have the air conditioning system serviced.

The present method also includes the step of detecting a predetermined resistance level from the electrical circuit.

The method includes the step of sending a DRS malfunction message to the operator of the air conditioning system 20 in response to failure of any of the detecting steps and the step of initiating an opening in the air conditioning system 20 in response to the step of sending the DRS malfunction message to allow the refrigerant to flow from the air conditioning system 20 to the atmosphere. In an alternative embodiment, the method includes the step of sending a DRS malfunction message to the operator of the air conditioning system 20 in response to failure of any of the detecting steps but does not initiate an opening in the air conditioning system 20 in response to the step of sending the DRS malfunction message. In another embodiment of the present invention, as shown in FIG. 3, the method does not send a DRS malfunction message to the operator in response to failure of any of the detecting steps and alternatively includes the step of initiating an opening in the air conditioning system 20 in response to failure of any of the detecting steps.

The method includes the step of sensing a first concentration of the refrigerant outside of the air conditioning system 20 with the sensor 60. If the sensor 60 detects refrigerant to be at an unacceptable level, noting that this threshold is specific to each refrigerant, one or more additional readings will be used to confirm the first reading through the step of sensing a second concentration of the refrigerant outside of the air conditioning system 20 with the sensors 60 in response to the first concentration exceeding a threshold concentration. The method includes the step of comparing the first and second concentrations in response to the step of sensing a second concentration and the step of sending a DRS leak message to the operator of the air conditioning system 20 in response to the first and second concentrations being above a predetermined concentration. The method further includes the step of initiating an opening in the air conditioning system 20 in response to the step of sending the DRS leak message to allow the refrigerant to flow from the air conditioning system 20 to the atmosphere. In an alternative embodiment of the present invention, the method includes the step of sending a DRS leak message to the operator of the air conditioning system 20 in response to the first and second concentrations being above a predetermined concentration but the method does not initiate an opening in the air conditioning system 20 in response to the step of sending the DRS leak message. In another embodiment of the present invention, as shown in FIG. 3, the method does not send a DRS leak message to the operator of the air conditioning system 20 in response to the first and second concentrations being above a predetermined concentration and alternatively includes the step of initiating an opening in the air conditioning system 20 in response to the first and second concentrations being above a predetermined concentration.

The method includes the step of continuously performing the detecting and sensing steps with the controller 62 in response to the engine being operative. When the engine is operative, the DRS system is preferably powered by the vehicle battery, and the vehicle battery's power is continually replenished from the engine power. The vehicle battery is generally considered the battery which provides the starting power for the vehicle, however, those skilled in the art realize there may be alternative batteries within the vehicle that are capable of powering the DRS system.

The method also includes the step of periodically performing the detecting and sensing steps with the controller 62 at the expiration of every predetermined period of seconds in response to the engine being inoperative without performing the detecting and sensing steps during the predetermined period. The predetermined period of time must adequately protect the occupants of the vehicle from potential exposure to refrigerant leakage, yet the predetermined period of time should be great enough to avoid draining the vehicle battery or the DRS back-up battery which is limited by size, cost, and weight. With all these considerations, the method includes the step of setting the predetermined period of time at 120 seconds or less to sufficiently protect the vehicle occupants.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of detecting a refrigerant leak from an air conditioning system having a controller and a sensor for sensing the presence of the refrigerant outside of the air conditioning system in a vehicle having an engine and a vehicle battery, said method comprising the steps of;
   sensing a first concentration of the refrigerant outside of the air conditioning system with the sensor, and
   periodically performing said sensing step with the controller at the expiration of every predetermined period of time without performing said sensing step during said predetermined period,
   wherein said periodically performing said sensing step is further defined as being in response to the engine being inoperative and including the step of continuously performing said sensing step with the controller in response to the engine being operative.

2. A method of ventilating an air conditioning system having a controller, a back-up battery, a directed relief system (DRS) electrical circuit, and a plurality of sensors for sensing the presence of the refrigerant outside of the air conditioning system in a vehicle having an engine and a vehicle battery, said method comprising the steps of;
   detecting a first voltage signal in the operating range of 9-16 Volts from the main vehicle in response to the engine being operative,
   detecting a second voltage signal in the operating range of 9-16 Volts from the back-up battery in response to the engine being inoperative,
   detecting the operation of the sensors,
   detecting a predetermined resistance level from the electrical circuit,
   sending a DRS malfunction message to the operator of the air conditioning system in response to failure of any of said detecting steps,
   initiating an opening in the air conditioning system in response to the DRS malfunction message to allow the refrigerant to flow from the air conditioning system to the atmosphere,
   sensing a first concentration of the refrigerant outside of the air conditioning system with the sensors,
   sensing a second concentration of the refrigerant outside of the air conditioning system with the sensors in response to the first concentration exceeding a threshold concentration,
   comparing the first and second concentrations in response to the step of sensing a second concentration,
   sending a DRS leak message to the operator of the air conditioning system in response to the first and second concentrations being above a predetermined concentration,
   initiating an opening in the air conditioning system in response to the DRS leak message to allow the refrigerant to flow from the air conditioning system to the atmosphere,
   continuously performing said detecting and sensing steps with the controller in response to the engine being operative, and
   periodically performing said detecting and sensing steps with the controller at the expiration of every predetermined period of seconds in response to the engine being inoperative without performing said detecting and sensing steps during said predetermined period.

* * * * *